(12) United States Patent
Cook

(10) Patent No.: US 11,130,365 B1
(45) Date of Patent: Sep. 28, 2021

(54) ANIMAL SKULL ILLUMINATION KIT

(71) Applicant: Leroy Cook, Dover, PA (US)

(72) Inventor: Leroy Cook, Dover, PA (US)

( * ) Notice: Subject to any disclaimer, the term of this patent is extended or adjusted under 35 U.S.C. 154(b) by 0 days.

(21) Appl. No.: 16/934,094

(22) Filed: Jul. 21, 2020

(51) Int. Cl.
| | |
|---|---|
| *B44F 1/06* | (2006.01) |
| *F21V 23/04* | (2006.01) |
| *F21V 23/02* | (2006.01) |
| *B44C 5/02* | (2006.01) |
| *F16M 13/02* | (2006.01) |
| *F21V 23/06* | (2006.01) |
| *F21Y 115/10* | (2016.01) |

(52) U.S. Cl.
CPC ............... *B44F 1/06* (2013.01); *B44C 5/02* (2013.01); *F16M 13/02* (2013.01); *F21V 23/023* (2013.01); *F21V 23/0435* (2013.01); *F21V 23/06* (2013.01); *F21Y 2115/10* (2016.08)

(58) Field of Classification Search
CPC ........................................................ B44C 5/02
See application file for complete search history.

(56) References Cited

U.S. PATENT DOCUMENTS

| | | | |
|---|---|---|---|
| 4,464,440 A | 8/1984 | Dotzman | |
| 4,477,500 A | 10/1984 | Powell | |
| 6,884,080 B2 | 4/2005 | Thompson | |
| D608,686 S | 1/2010 | St Ama | |
| 8,512,045 B2 | 8/2013 | Bittner | |
| 9,587,821 B2 | 3/2017 | Carroll | |
| 10,986,887 B1* | 4/2021 | Kubasco | F21V 21/0832 |
| 2006/0154224 A1 | 7/2006 | St Ama | |
| 2009/0298384 A1* | 12/2009 | Connolly | A63H 3/006 |
| | | | 446/389 |
| 2012/0071971 A1* | 3/2012 | Martin | G09B 23/30 |
| | | | 623/4.1 |
| 2013/0215617 A1* | 8/2013 | Carroll | H01R 43/26 |
| | | | 362/253 |

* cited by examiner

*Primary Examiner* — Evan P Dzierzynski

(57) ABSTRACT

The animal skull illumination kit generates illumination. The animal skull illumination kit is configured for use with a display. The display further comprises a skull that is mounted on a mounting panel. The animal skull illumination kit mounts in the skull such that the animal skull illumination kit illuminates the skull. The animal skull illumination kit is remotely controlled. The animal skull illumination kit is independently powered. The animal skull illumination kit is formed as a kit. By kit is meant that all the materials necessary to install the animal skull illumination kit in the skull are provisioned with the animal skull illumination kit. The animal skull illumination kit incorporates a plurality of transparent mounts, an adhesive module, and a control circuit. The adhesive module secures the plurality of transparent mounts to the display. The control circuit generates the illumination provided by the plurality of transparent mounts.

17 Claims, 4 Drawing Sheets

ANIMAL SKULL ILLUMINATION KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and the combination of lighting with other structures, more specifically, a lighting structure incorporated in a decorative fixture. (F21V33/0028)

SUMMARY OF INVENTION

The animal skull illumination kit is a device that generates illumination. The animal skull illumination kit is configured for use with a display. The display further comprises a skull that is mounted on a mounting panel. The animal skull illumination kit mounts in the skull such that the animal skull illumination kit illuminates the skull. The animal skull illumination kit is remotely controlled. The animal skull illumination kit is independently powered. By independently powered is meant that the animal skull illumination kit can operate without an electrical connection to an external power source. The animal skull illumination kit is formed as a kit. By kit is meant that all the materials necessary to install the animal skull illumination kit in the skull are provisioned with the animal skull illumination kit. The animal skull illumination kit comprises a plurality of transparent mounts, an adhesive module, and a control circuit. The adhesive module secures the plurality of transparent mounts to the display. The control circuit generates the illumination provided by the plurality of transparent mounts.

These together with additional objects, features and advantages of the animal skull illumination kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal skull illumination kit in detail, it is to be understood that the animal skull illumination kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal skull illumination kit.

It is therefore important that the claims be regarded as including such equivalent construction insofar as they do not depart from the spirit and scope of the animal skull illumination kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
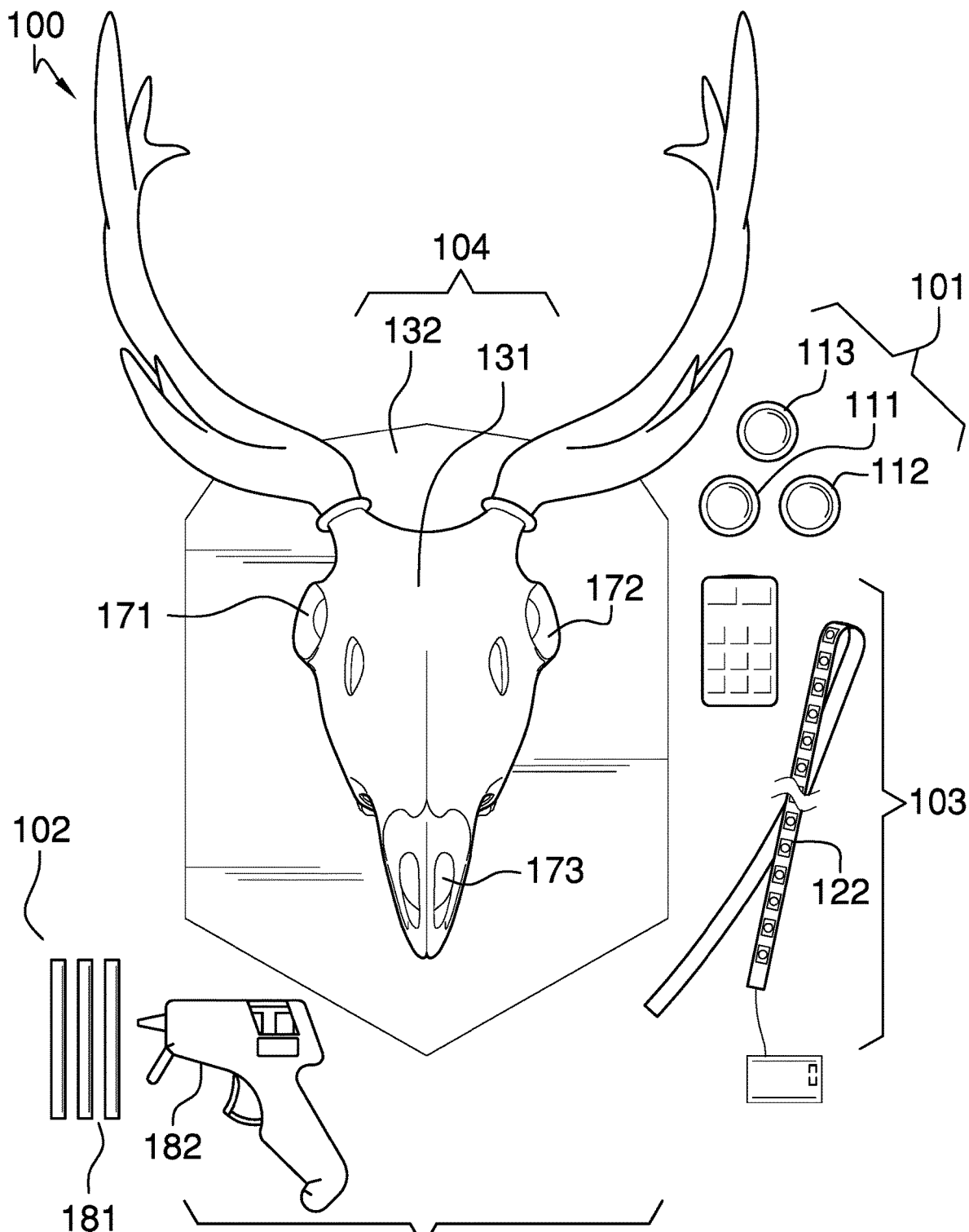
FIG. 1 is a kit view of an embodiment of the disclosure.
Figure 2:
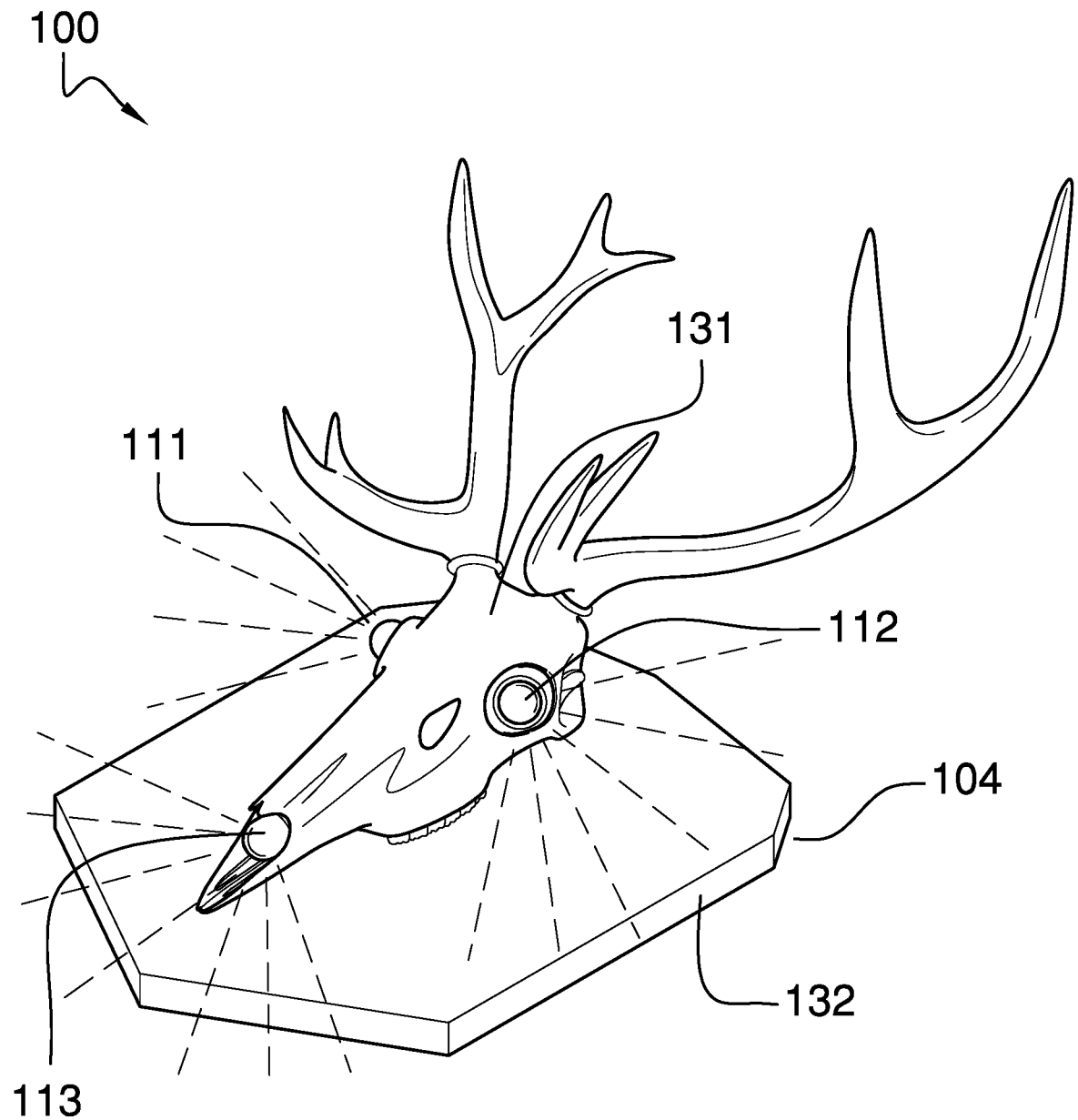
FIG. 2 is an in-use view of an embodiment of the disclosure.
Figure 3:
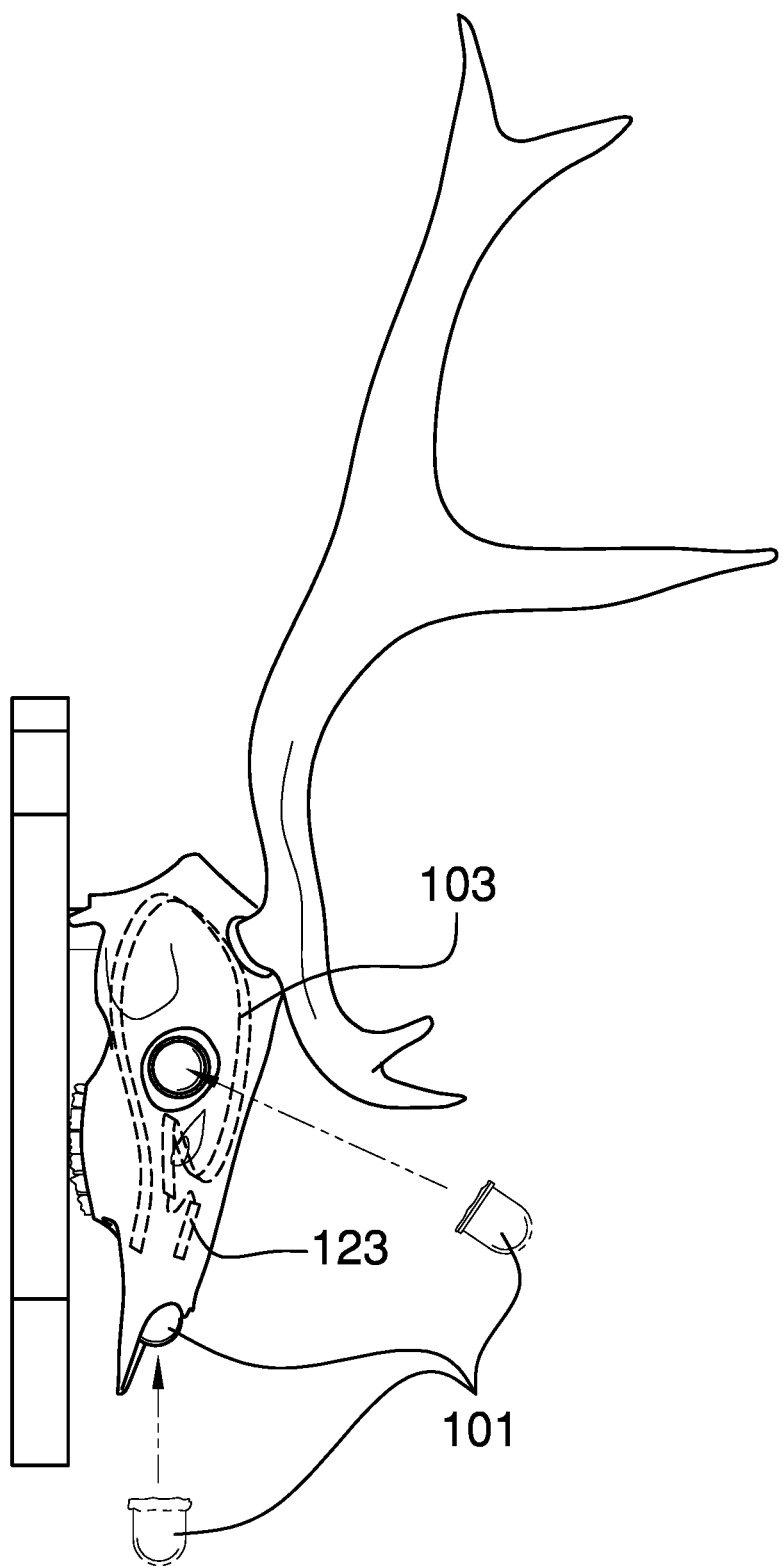
FIG. 3 is a side view of an embodiment of the disclosure.
Figure 4:
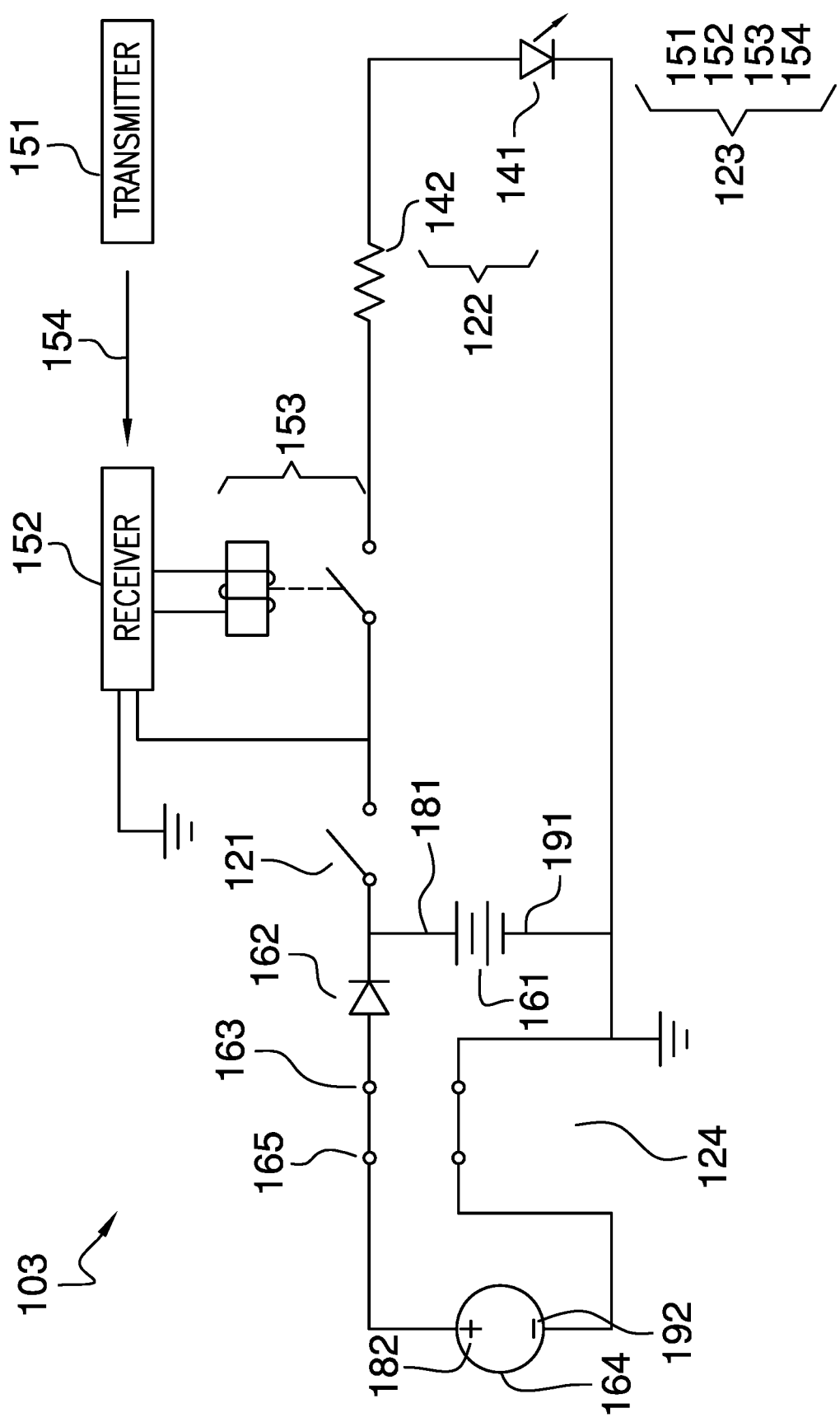
FIG. 4 is a schematic view of an embodiment of the disclosure.

Detailed reference will now be made to one or more potential embodiments of the disclosure, which are illustrated in FIGS. 1 through 5.

The animal skull illumination kit 100 (hereinafter invention) is a device that generates illumination. The invention 100 is configured for use with a display 104. The display 104 further comprises a skull 131 that is mounted on a mounting panel 132. The invention 100 mounts in the skull 131 such that the invention 100 illuminates the skull 131. The invention 100 is remotely controlled. The invention 100 is independently powered. By independently powered is meant that the invention 100 can operate without an electrical connection to an external power source 164. The invention 100 is formed as a kit. By kit is meant that all the materials necessary to install the invention 100 in the skull 131 are provisioned with the invention 100. The invention 100 comprises a plurality of transparent mounts 101, an adhesive module 102, and a control circuit 103. The adhesive module 102 secures the plurality of transparent mounts 101 to the display 104. The control circuit 103 generates the illumination provided by the plurality of transparent mounts 101.

The display 104 is a decorative object. The display 104 is assumed to be a clearly visible object. The display 104 is defined elsewhere in this disclosure. In the first potential embodiment of the disclosure, the display 104 comprises a skull 131 and a mounting panel 132. The skull 131 mounts on the mounting panel 132.

The mounting panel 132 is a plate structure. The mounting panel 132 forms a pedestal used to display the skull 131. The mounting panel 132 forms a load path that transfers the loads of the skull 131 and the control circuit 103 to a supporting structure.

The skull 131 is an anatomic structure. The skull 131 comprises one or more bone structures that form a cavity used to enclose the brain of a vertebrate animal. The skull 131 further comprises a first ocular cavity 171, a second ocular cavity 172, and a nasal cavity 173.

The first ocular cavity 171 is a cavity that is formed in the skull 131 of the animal. The first ocular cavity 171 is the space where a first eye of the animal that provided the source for the skull 131 was located. The second ocular cavity 172 is a cavity that is formed in the skull 131 of the animal. The second ocular cavity 172 is the space where a second eye of the animal that provided the source for the skull 131 was located. The nasal cavity 173 is a cavity that is formed in the skull 131 of the animal. The nasal cavity 173 is the space where the nasal structures of the animal that provided the source for the skull 131 was located.

Each of the plurality of transparent mounts 101 is a rigid structure. Each of the plurality of transparent mounts 101 is selected from the group consisting of a transparent structure and a semi-transparent structure. Each of the plurality of transparent mounts 101 is selected from the group consisting of a tinted structure and a non-tinted structure. The terms transparent, semi-transparent, and tinted are defined elsewhere in this disclosure. The exterior surface of each of the plurality of transparent mounts 101 forms a non-Euclidean plane. Each of the plurality of transparent mounts 101 permanently attaches to the display 104. Each of the plurality of transparent mounts 101 encloses an aperture formed through the display 104. Each of the plurality of transparent mounts 101 forms a transparent barrier through which the illumination generated by the control circuit 103 passes.

In the first potential embodiment of the disclosure, the shape of each of the plurality of transparent mounts 101 is selected to emulate a portion of the shape of the animal that provided the source for the skull 131. Each of the plurality of transparent mounts 101 attaches to the display 104 using an adhesive. Each of the plurality of transparent mounts 101 attaches to a location on the skull 131 selected from the group consisting of: a) the first ocular cavity 171; b) the second ocular cavity 172; and, c) the nasal cavity 173. The plurality of transparent mounts 101 comprises a first ocular cavity 171 mount 111, a second ocular cavity 172 mount 112, and a nasal cavity 173 mount 113.

The first ocular cavity 171 mount 111 is a transparent structure. The first ocular cavity 171 mount 111 resembles the shape of the eye of the animal that provided the source for the skull 131. The first ocular cavity 171 mount 111 inserts into and attaches to the first ocular cavity 171 of the skull 131.

The second ocular cavity 172 mount 112 is a transparent structure. The second ocular cavity 172 mount 112 resembles the shape of the eye of the animal that provided the source for the skull 131. The second ocular cavity 172 mount 112 inserts into and attaches to the second ocular cavity 172 of the skull 131.

The nasal cavity 173 mount 113 is a transparent structure. The nasal cavity 173 mount 113 resembles the shape of the nose of the animal that provided the source for the skull 131. The nasal cavity 173 mount 113 inserts into and attaches to the nasal cavity 173 of the skull 131.

The adhesive module 102 is an electromechanical device. The adhesive module 102 is a heated device. The adhesive module 102 distributes a liquid phase adhesive used to secure a transparent mount selected from the plurality of transparent mounts 101 to the display 104. The adhesive module 102 permanently attaches the transparent mount selected from the plurality of transparent mounts 101 to the display 104. The adhesive module 102 comprises a solid phase adhesive 105 and a heating structure 106.

The solid phase adhesive 105 is a chemical substance. The solid phase adhesive 105 is an adhesive. The solid phase adhesive 105 permanently adheres each transparent mount selected from the plurality of transparent mounts 101 to the display 104. The solid phase adhesive 105 is provisioned by the invention 100 in a solid phase. The heating structure 106 heats the solid phase adhesive 105 into a liquid phase. The solid phase adhesive 105 is simultaneously applied to each transparent mount contained in the plurality of transparent mounts 101 and the display 104. The region of the selected transparent mount that is coated with the solid phase adhesive 105 in a liquid phase is pressed against the region of the display 104 is coated with the solid phase adhesive 105 in a liquid phase. As the solid phase adhesive 105 cools and resolidifies, the solid phase adhesive 105 forms an adhesive bond that permanently adheres each of the plurality of transparent mounts 101 to the display 104.

The heating structure 106 is an electromechanical device. The heating structure 106 is an electrically powered device. The heating structure 106 is formed with a heating element. The heating structure 106 generates the heat necessary to melt the solid phase adhesive 105 into the liquid phase.

The control circuit 103 is an electric circuit. The control circuit 103 mounts in the interior space formed by the display 104. The control circuit 103 is a remotely controlled device. The term remote control 123 is defined elsewhere in this disclosure. The control circuit 103 is an independently powered electric circuit. By independently powered is meant that the control circuit 103 can operate without an electrical connection to an external power source 164. The control circuit 103 comprises a master switch 121, a lamp circuit 122, a remote control 123, and a power circuit 124. The master switch 121, the lamp circuit 122, the remote control 123, and the power circuit 124 are electrically interconnected.

The master switch 121 is a maintained switch. The switch and the maintained switch are defined elsewhere in this disclosure. The master switch 121 electrically connects in series between the power circuit 124 and the remote control 123. The master switch 121 controls the flow of electricity between the power circuit 124 and the remote control 123. The master switch 121 controls the operation of the control circuit 103. The master switch 121 acts as a power switch that enables the operation of the invention 100.

The lamp circuit 122 is an electric circuit. The lamp circuit 122 electrically connects in series between the remote control 123 and the power circuit 124. The lamp circuit 122 physically generates the illumination for the control circuit 103. The lamp circuit 122 comprises a plurality of LEDs 141 and a limit resistor 142. The plurality of LEDs 141 and the limit resistor 142 electrically connect in series.

Each of the plurality of LEDs 141 is a two-terminal electric device. Each of the plurality of LEDs 141 generates a portion of the illumination generated by the control circuit 103. The passing of an electric current through each of the plurality of LEDs 141 illuminates each of the plurality of LEDs 141. The plurality of LEDs 141 electrically connects in series between the limit resistor 142 and the battery 161 of the power circuit 124. The limit resistor 142 is a resistor. The limit resistor 142 electrically connects in series between the relay 153 of the remote control 123 and the plurality of LEDs 141. The limit resistor 142 limits the flow of electricity through the plurality of LEDs 141.

The remote control 123 is an electrically powered and operated device. The remote control 123 electrically connects in series between the power circuit 124 and the lamp circuit 122. The remote control 123 controls the flow of electricity from the power circuit 124 into the lamp circuit 122. The remote control 123 initiates the illumination of the lamp circuit 122. The remote control 123 extinguishes the illumination of the lamp circuit 122. The remote control 123 allows for the operation of the control circuit 103 without requiring a physical presence at the control circuit 103. The remote control 123 comprises a transmitter 151, a receiver 152, a relay 153, and a radio frequency transmission 154. The radio frequency transmission 154 forms a communication link between the transmitter 151 and the receiver 152. The radio frequency transmission 154 transfers operating instructions from the transmitter 151 to the receiver 152. The relay 153 electrically connects to the receiver 152. The receiver 152 controls the operation of the relay 153.

The transmitter 151 is an electric circuit. The transmitter 151 transmits radio frequency operating instructions to the receiver 152 over the radio frequency transmission 154. The operating instructions transmitted by the transmitter 151 provides the receiver 152 with an instruction selected from the group consisting of: a) actuating the relay 153 to a closed position; and, b) actuating the relay 153 to an open position. The receiver 152 receives the selected operating instruction from the transmitter 151 over the radio frequency transmission 154. Upon receipt of the appropriate instruction from the transmitter 151, the receiver 152 actuates the relay 153 to a closed position based. Upon receipt of the appropriate instruction from the transmitter 151, the receiver 152 actuates the relay 153 to an open position.

The relay 153 is an electrically controlled switch. The relay 153 electrically connects in series between the master switch 121 and the limit resistor 142. The receiver 152 controls the operation of the relay 153. The receiver 152 actuates the relay 153 between a closed position and an open position. When the master switch 121 is in the closed position, the actuation of the relay 153 to the closed position illuminates the lamp circuit 122. When the master switch 121 is in the closed position, the actuation of the relay 153 to the open position extinguishes the lamp circuit 122. When the master switch 121 is in the open position, the lamp circuit 122 remains extinguished regardless of the actuation position of the relay 153.

The radio frequency transmission 154 is a wireless communication link established by the transmitter 151 with the receiver 152. The transmitter 151, the receiver 152, the relay 153, the remote control 123, the term wireless, and the term communication link are defined elsewhere in this disclosure.

In the first potential embodiment of the disclosure, the transmitter 151, the receiver 152, the relay 153, and the radio frequency transmission 154 are provisioned through a remote control 123 kit. The remote control 123 kit is a commercially available product commonly marketed as a 433 MHz remote control switch and transmitter.

The power circuit 124 is an electrical circuit. The power circuit 124 powers the operation of the control circuit 103. The power circuit 124 is an electrochemical device. The power circuit 124 converts chemical potential energy into the electrical energy required to power the control circuit 103. The power circuit 124 comprises a battery 161, a diode 162, a charging port 163, and an external power source 164. The battery 161 further comprises a first positive terminal 181 and a first negative terminal 191. The external power source 164 further comprises a charging plug 165, a second positive terminal 182, and a second negative terminal 192. The battery 161, the diode 162, the charging port 163, the external power source 164, and the charging plug 165 are electrically interconnected.

The battery 161 is an electrochemical device. The battery 161 converts chemical potential energy into the electrical energy used to power the control circuit 103. The battery 161 is a commercially available rechargeable battery 161. The chemical energy stored within the rechargeable battery 161 is renewed and restored through the use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The diode 162 is an electrical device that allows current to flow in only one direction. The diode 162 installs between the rechargeable battery 161 and the charging port 163 such that electricity will not flow from the first positive terminal 181 of the rechargeable battery 161 into the second positive terminal 182 of the external power source 164. In the first potential embodiment of the disclosure, the external power source 164, the charging plug 165, and the charging port 163 are compatible with USB power requirements.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Battery: As used in this disclosure, a battery is a chemical device consisting of one or more cells, in which chemical energy is converted into electricity and used as a source of power. Batteries are commonly defined with a positive terminal and a negative terminal.

Communication Link: As used in this disclosure, a communication link refers to the structured exchange of data between two objects.

Control Circuit: As used in this disclosure, a control circuit is an electrical circuit that manages and regulates the behavior or operation of a device.

Crystal: As used in this disclosure, a crystal refers to a three-dimensional solid material whose molecules are arranged in a regular (or repeating) geometric structure. A crystal will often have a symmetric structure.

Decorative: As used in this disclosure, decorative is an adjective that refers to a first object or item that is used with a second object or item of the purpose of making the second object or item more attractive. Decorative will generally, but not necessarily, implies making the second object or item more visually attractive.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display refers to an object that: a) is located in a readily visible location; such that, b) the attention of individuals is drawn towards the object.

Electromagnetic Radiation: As used in this disclosure, electromagnetic radiation refers to an interaction between electric fields and magnetic fields that is capable of transmitting energy through a vacuum.

External Power Source: As used in this disclosure, an external power source is a source of the energy that is externally provided to enable the operation of the present disclosure. Examples of external power sources include, but are not limited to, electrical power sources and compressed air sources.

Field of Illumination: As used in this disclosure, a field of illumination refers to an area illuminated by electromagnetic radiation projected from an electrical device such as a lamp or transmission antenna.

Fluid: As used in this disclosure, a fluid refers to a state of matter wherein the matter is capable of flow and takes the shape of a container it is placed within. The term fluid commonly refers to a liquid or a gas.

Gas: As used in this disclosure, a gas refers to a state (phase) of matter that is fluid and that fills the volume of the structure that contains it. Stated differently, the volume of a gas always equals the volume of its container.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Illumination: As used in this disclosure, illumination refers to electromagnetic radiation contained with an area. Illumination is a synonym for light, particularly in cases where a measure of the amount of visible electromagnetic radiation in a space is called for.

Kit: As used in this disclosure, a kit is an assembly of a combination of instruments, equipment, or supplies that are dedicated or intended for use in a specific purpose. Depending on the context, a kit may further include the container within which the instruments, equipment, and supplies are stored.

Lamp: As used in this disclosure, a lamp is an electrical circuit that generates (typically visible spectrum) electromagnetic radiation.

Light: As used in this disclosure, light refers to electromagnetic radiation that illuminates an area. Illumination is a synonym for light, particularly in cases where a measure of the amount of light in a space is called for.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: A used in this disclosure, a maintained switch is a switch that maintains the position that was set in the most recent switch actuation. A maintained switch works in an opposite manner to a momentary switch.

Melt: As used in this disclosure, melt refers to the phase change of a substance from a solid phase to a liquid phase.

Non-Euclidean Plane: As used in this disclosure, a non-Euclidean plane is a geometric plane that is formed with a curvature such that: a) two parallel lines will intersect somewhere in the planar surface; or, b) the span of the perpendicular distance between two parallel lines will vary as a function of the position of the plane. In many geometries, the statements (a) and (b) can be considered identical statements. A non-Euclidean plane (or surface) is said to form a roughly Euclidean plane (or surface) when the span of the minimum distance between two points on the non-Euclidean plane as measured along the non-Euclidean plane is less than or equal to 1.1 times the absolute minimum distance between the same two points.

Pedestal: As used in this disclosure, a pedestal is an intermediary load bearing structure that that forms a load path between two objects or structures.

Phase: As used in this disclosure, phase refers to the state of the form of matter. The common states of matter are solid, liquid, gas, and plasma.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Radiation: As used in this disclosure, radiation refers to the discharge of energy from an object. The term is often applied to energy in the form of: a) waves, such as electromagnetic radiation or acoustic energy; b) nuclear radiation such as alpha, beta, and gamma, particle radiation; and, c) gravitational waves. The radiation of electromagnetic waves is often classified by the wavelength of the generated waves, such as ultraviolet and infrared radiation.

Radio Frequency: As used in this disclosure, a radio frequency refers to electromagnetic radiation that is propogated in a spectrum ranging from 10 KHz to 1 THz.

Receiver: As used in this disclosure, a receiver is an electric device that is used to receive and demodulate electromagnetic radiation such as radio signals.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Remote Control: As used in this disclosure, remote control means the establishment of control of a device from a distance. Remote control is generally accomplished through the use of an electrical device that generates electrically based control signals that are transmitted via radio frequencies or other means to the device.

Rigid Structure: As used in this disclosure, a rigid structure is a solid structure formed from an inelastic material that resists changes in shape. A rigid structure will permanently deform as it fails under a force. See bimodal flexible structure.

Semitransparent: As used in this disclosure, semitransparent refers to an object that is partially transparent. By partially transparent is meant: a) that only a proportion of the light that strikes a semitransparent structure will pass through the semitransparent structure; and, b) that the light is scattered as it passes through the semitransparent structure such that objects cannot be clearly seen through the semitransparent structure. Use tinted when objects can be clearly seen.

Solid: As used in this disclosure, a solid refers to a state (phase) of matter that: 1) has a fixed volume; and, 2) does not flow.

Solidification: As used in this disclosure, solidification refers to the phase change of a substance from a liquid phase to a solid phase. The term freezing refers to the solidification of water from a liquid phase to a phase change. The term crystallization refers to the phase change of a substance from a liquid phase to a solid phase with a crystal structure.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tinted: As used in this this disclosure, a tinted object is an first object made of first transparent material that has been coated, treated, or processed with a second material that reduces the amount of light that passes through the transparent material of the first object while not significantly scattering the light that passes through the first transparent material such that object behind the first object would remain clearly visible.

Transmitter: As used in this disclosure, a transmitter is a device that is used to generate and transmit electromagnetic radiation such as radio signals.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

Visible Light: As used in this disclosure, visible light refers to electromagnetic radiation with a wavelength in the approximate range of 400 nanometers to 800 nanometers.

Wave: As used in this disclosure, a wave is a mechanism capable of transferring energy without transferring mass. Specifically, a wave refers to a transfer of momentum or energy through an object or medium such that there is no significant change in the relative positions of the particles (or molecules) that make up the object or medium.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An illumination device comprising
a plurality of transparent mounts, an adhesive module, and a control circuit;
wherein the adhesive module secures the plurality of transparent mounts to a display;
wherein the illumination device is formed as a kit;
wherein the illumination device is configured for use with the display;
wherein the illumination device is remotely controlled; wherein the illumination device is independently powered; wherein by independently powered is meant that the illumination device can operate without an electrical connection to an external power source; wherein the control circuit comprises a master switch, a lamp circuit, a remote control, and a power circuit;

wherein the master switch, the lamp circuit, the remote control, and the power circuit are electrically interconnected;
wherein the master switch is a maintained switch;
wherein the master switch electrically connects in series between the power circuit and the remote control;
wherein the master switch controls the flow of electricity between the power circuit and the remote control;
wherein the master switch controls the operation of the control circuit; wherein the master switch acts as a power switch that enables the operation of
the illumination device; wherein the lamp circuit is an electric circuit;
wherein the lamp circuit electrically connects in series between the remote control and the power circuit;
wherein the lamp circuit physically generates the illumination for the control circuit;
wherein the remote control is an electrically powered and operated device;
wherein the remote control electrically connects in series between the power circuit and the lamp circuit;
wherein the remote control controls the flow of electricity from the power circuit into the lamp circuit;
wherein the remote control initiates the illumination of the lamp circuit;
wherein the remote control extinguishes the illumination of the lamp circuit;
wherein the remote control allows for the operation of the control circuit without requiring a physical presence at the control circuit;
wherein the power circuit is an electrical circuit;
wherein the power circuit powers the operation of the control circuit;
wherein the power circuit is an electrochemical device;
wherein the power circuit converts chemical potential energy into the electrical energy required to power the control circuit;
wherein the display comprises a skull and a mounting panel; wherein the skull mounts on the mounting panel; wherein the mounting panel is a plate structure; wherein the mounting panel forms a pedestal used to display the skull; wherein the mounting panel forms a load path that transfers the loads of the skull and the control circuit to a supporting structure.

2. The illumination device according to claim 1
wherein each of the plurality of transparent mounts is a rigid structure;
wherein each of the plurality of transparent mounts is selected from the group consisting of a transparent structure and a semi-transparent structure;
wherein each of the plurality of transparent mounts is selected from the group consisting of a tinted structure and a non-tinted structure.

3. The illumination device according to claim 2
wherein the exterior surface of each of the plurality of transparent mounts forms a non-Euclidean plane;
wherein each of the plurality of transparent mounts permanently attaches to the display;
wherein each of the plurality of transparent mounts encloses an aperture formed through the display;
wherein each of the plurality of transparent mounts forms a transparent barrier through which the illumination generated by the control circuit passes.

4. The illumination device according to claim 3 wherein each of the plurality of transparent mounts attaches to the display using an adhesive.

5. The illumination device according to claim 4
wherein the adhesive module is an electromechanical device;
wherein the adhesive module is a heated device;
wherein the adhesive module distributes a liquid phase adhesive used to secure a transparent mount selected from the plurality of transparent mounts to the display;
wherein the adhesive module permanently attaches the transparent mount selected from the plurality of transparent mounts to the display.

6. The illumination device according to claim 5
wherein the control circuit is an electric circuit;
wherein the control circuit mounts in the interior space formed by the display;
wherein the control circuit is a remotely controlled device.

7. The illumination device according to claim 6
wherein the control circuit is an independently powered electric circuit;
wherein by independently powered is meant that the control circuit can operate without an electrical connection to an external power source.

8. The illumination device according to claim 7
wherein the adhesive module comprises a solid phase adhesive and a heating structure;
wherein the heating structure heats the solid phase adhesive into a liquid phase.

9. The illumination device according to claim 8
wherein the solid phase adhesive is a chemical substance;
wherein the solid phase adhesive is an adhesive;
wherein the solid phase adhesive permanently adheres each transparent mount selected from the plurality of transparent mounts to the display;
wherein the solid phase adhesive is provisioned in a solid phase;
wherein the solid phase adhesive is simultaneously applied to each transparent mount contained in the plurality of transparent mounts and the display;
wherein the region of the selected transparent mount that is coated with the solid phase adhesive in a liquid phase is pressed against the region of the display is coated with the solid phase adhesive in a liquid phase;
wherein as the solid phase adhesive cools and resolidifies, the solid phase adhesive forms an adhesive bond that permanently adheres each of the plurality of transparent mounts to the display.

10. The illumination device according to claim 9
wherein the heating structure is an electromechanical device;
wherein the heating structure is an electrically powered device;
wherein the heating structure is formed with a heating element;
wherein the heating structure generates the heat necessary to melt the solid phase adhesive into the liquid phase.

11. The illumination device according to claim 10
wherein the lamp circuit comprises a plurality of LEDs and a limit resistor;
wherein the plurality of LEDs and the limit resistor electrically connect in series;
wherein the remote control comprises a transmitter, a receiver, a relay, and a radio frequency transmission;
wherein the radio frequency transmission forms a communication link between the transmitter and the receiver;
wherein the radio frequency transmission transfers operating instructions from the transmitter to the receiver;
wherein the relay electrically connects to the receiver;

wherein the receiver controls the operation of the relay;
wherein the power circuit comprises a battery, a diode, a charging port, and an external power source;
wherein the battery further comprises a first positive terminal and a first negative terminal;
wherein the external power source further comprises a charging plug, a second positive terminal, and a second negative terminal;
wherein the battery, the diode, the charging port, the external power source, and the charging plug are electrically interconnected.

12. The illumination device according to claim 11
wherein each of the plurality of LEDs is a two-terminal electric device;
wherein each of the plurality of LEDs generates a portion of the illumination generated by the control circuit;
wherein the passing of an electric current through each of the plurality of LEDs illuminates each of the plurality of LEDs;
wherein the plurality of LEDs electrically connects in series between the limit resistor and the battery of the power circuit;
wherein the limit resistor is a resistor;
wherein the limit resistor electrically connects in series between the relay of the remote control and the plurality of LEDs;
wherein the limit resistor limits the flow of electricity through the plurality of LEDs.

13. The illumination device according to claim 12
wherein the transmitter is an electric circuit;
wherein the transmitter transmits radio frequency operating instructions to the receiver over the radio frequency transmission;
wherein the operating instructions transmitted by the transmitter provides the receiver with an instruction selected from the group consisting of: a) actuating the relay to a closed position; and, b) actuating the relay to an open position;
wherein the receiver receives the selected operating instruction from the transmitter over the radio frequency transmission;
wherein upon receipt of the appropriate instruction from the transmitter, the receiver actuates the relay to a closed position based;
wherein upon receipt of the appropriate instruction from the transmitter, the receiver actuates the relay to an open position;
wherein the relay is an electrically controlled switch;
wherein the relay electrically connects in series between the master switch and the limit resistor;
wherein the receiver controls the operation of the relay;
wherein the receiver actuates the relay between a closed position and an open position;
wherein when the master switch is in the closed position, the actuation of the relay to the closed position illuminates the lamp circuit;
wherein when the master switch is in the closed position, the actuation of the relay to the open position extinguishes the lamp circuit;
wherein when the master switch is in the open position, the lamp circuit remains extinguished regardless of the actuation position of the relay;
wherein the radio frequency transmission is a wireless communication link established by the transmitter with the receiver.

14. The illumination device according to claim 13
wherein the battery is a rechargeable battery;
wherein the charging port is an electrical circuit that reverses the polarity of the rechargeable battery and provides the energy necessary to reverse the chemical processes that the rechargeable battery initially used to generate the electrical energy;
wherein the charging port forms an electrical connection to an external power source using a charging plug;
wherein the charging plug forms a detachable electrical connection with the charging port;
wherein the charging port receives electrical energy from the external power source through the charging plug;
wherein the diode is an electrical device that allows current to flow in only one direction;
wherein the diode installs between the rechargeable battery and the charging port such that electricity will not flow from the first positive terminal of the rechargeable battery into the second positive terminal of the external power source.

15. The illumination device according to claim 14
wherein the skull is an anatomic structure;
wherein the skull comprises one or more bone structures that form a cavity used to enclose the brain of a vertebrate animal;
wherein the skull further comprises a first ocular cavity, a second ocular cavity, and a nasal cavity;
wherein the first ocular cavity is a cavity that is formed in the skull of the animal;
wherein the first ocular cavity is the space where a first eye of the animal that provided the source for the skull was located;
wherein the second ocular cavity is a cavity that is formed in the skull of the animal;
wherein the second ocular cavity is the space where a second eye of the animal that provided the source for the skull was located;
wherein the nasal cavity is a cavity that is formed in the skull of the animal;
wherein the nasal cavity is the space where the nasal structures of the animal that provided the source for the skull was located;
wherein the shape of each of the plurality of transparent mounts is selected to emulate a portion of the shape of the animal that provided the source for the skull.

16. The illumination device according to claim 15
wherein each of the plurality of transparent mounts attaches to a location on the skull selected from the group consisting of: a) the first ocular cavity; b) the second ocular cavity; and, c) the nasal cavity.

17. The illumination device according to claim 16
wherein the plurality of transparent mounts comprises a first ocular cavity mount, a second ocular cavity mount, and a nasal cavity mount;
wherein the first ocular cavity mount is a transparent structure;
wherein the first ocular cavity mount resembles the shape of the eye of the animal that provided the source for the skull;
wherein the first ocular cavity mount inserts into and attaches to the first ocular cavity of the skull;
wherein the second ocular cavity mount is a transparent structure;
wherein the second ocular cavity mount resembles the shape of the eye of the animal that provided the source for the skull;

wherein the second ocular cavity mount inserts into and attaches to the second ocular cavity of the skull;

wherein the nasal cavity mount is a transparent structure;

wherein the nasal cavity mount resembles the shape of the nose of the animal that provided the source for the skull;

wherein the nasal cavity mount inserts into and attaches to the nasal cavity of the skull.

\* \* \* \* \*